T. D. McMULLEN.
STEERING WHEEL.
APPLICATION FILED DEC. 9, 1919.
1,378,478.
Patented May 17, 1921.
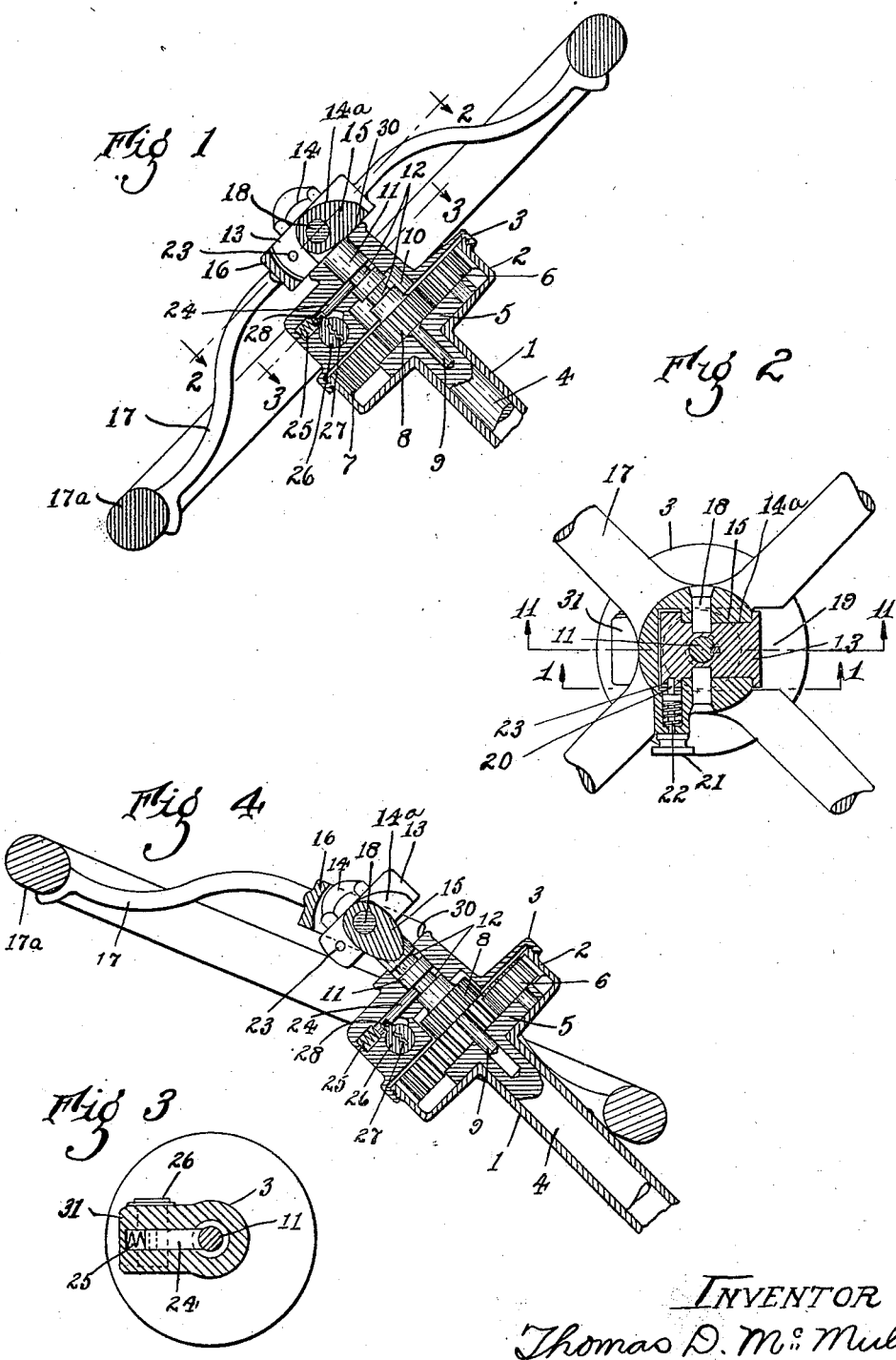
INVENTOR
Thomas D. McMullen
BY Brockett & Hyde
ATT'YS

UNITED STATES PATENT OFFICE.

THOMAS D. McMULLEN, OF EAST CLEVELAND, OHIO.

STEERING-WHEEL.

1,378,478.   Specification of Letters Patent.   Patented May 17, 1921.

Application filed December 9, 1919. Serial No. 343,512.

*To all whom it may concern:*

Be it known that I, THOMAS D. MCMULLEN, a citizen of the Dominion of Canada, residing at East Cleveland, in the county of Cuyahoga and State of Ohio, have invented certain new and useful Improvements in Steering-Wheels, of which the following is a specification.

This invention relates to steering wheels for motor vehicles.

The object of the invention is to provide an improved steering wheel which combines two desirable features of such wheels, to wit, the ability to tilt the wheel to an inclined position to give the driver more room, and the ability to also lock the wheel in disconnected or uncoupled relation with the steering shaft to prevent theft or unauthorized use.

A further object of the invention is to provide improved steering wheel mechanism in which tilting movement of the wheel produces uncoupling or disconnecting movement of the steering parts, thereby to simplify the construction and enable both of the foregoing features to be secured in a simple manner.

Further objects of the invention are in part obvious and in part will appear more in detail hereinafter.

The invention comprises the construction and arrangement of parts hereinafter described and claimed.

In the drawings, which represent one suitable embodiment of the invention, Figure 1 is a sectional elevation partly on the line 1—1 and partly on the line 11—11, Fig. 2; Fig. 2 is a sectional plan view on the line 2—2, Fig. 1; Fig. 3 is a sectional plan view on the line 3—3, Fig. 1; and Fig. 4 is a view corresponding to Fig. 1 and illustrating another position of the parts.

The drawings show the invention applied to the steering mechanism of the Ford automobile, but only for purposes of illustration, as the invention is applicable to any form of steering mechanism. As shown, 1 indicates a cylindrical steering post provided with a hollow head 2 threaded to receive the cap 3. In said post is a rotatable steering shaft 4 which is connected at its lower end to suitable mechanism (not shown) for producing turning movement of the vehicle wheels, and which mechanism forms no part of the present invention, is well known and requires no description. Steering shaft 4 at its upper end is provided with a spider or frame 5 in which are journaled several, usually three, pinions 6 which have planetary movement around and mesh with the internal gear teeth 7 on the inside of the head 2. These pinions 6 mesh with a central driving gear 8 co-axial with the shaft 4 and which is carried by a shaft 11 having a spindle end 9 turning in an opening in the shaft 4.

So far as described to this point the parts are identical with the usual Ford construction.

Cap 3, according to the present invention, is of special form having increased height to provide an axial chamber, space or recess 10 to receive the gear 8. The shaft 11 carrying said gear has turning movement in the cap and is provided therein with two annular grooves 12, whose purpose will appear. Above the cap, shaft 11 is provided with a block or frame 13, which may be an integral part of the shaft or may be a separate part secured in place, for example by the nut 14. Block 13 in plan view is of substantially rectangular form but is provided in its opposite sides with recesses 14$^a$ to receive two cam or toggle members 15 which are carried by, are secured to, or are integral with the hub 16 of the steering wheel, which is provided with the usual spokes 17 and rim 17$^a$. Steering wheel hub 16 surrounds the frame 13 and is pivoted thereto on a horizontal axis through the trunnions 18, said horizontal axis passing through the central axis of the steering post and also through the cams 15. One end of the rectangular recess in the steering wheel hub is open at 19. In a portion of said hub is located a locking plunger 20 having an exposed head 21 and which plunger is normally pressed inwardly by a compression spring 22 to engage its inner end in a locking recess 23 of the frame 13.

24 indicates a locking bolt slidable transversely in a recess of the cap 3 and normally pressed inwardly by a compression spring 25. This bolt coöperates in locking engagement with one or the other of the annular grooves 12, but may be withdrawn by actuation of a suitable lock 26 having a key slot 27. This lock may be of any suitable form, such as a Yale lock, and is so arranged that a rotatable part of the lock actuated by the key is provided with a projection 28 working in a recess of the lock bolt 24 for actuating the same.

Fig. 1 represents the normal position of the parts. The steering wheel is in normal position in a plane transverse to the axis of the steering shaft, in which position it is held by the latching plunger 20. The hub of the steering wheel surrounds and is in driving engagement with the frame 13 so that the turning movement of the wheel is transmitted to the shaft 11. The relatively large size of the frame 13 and its rectangular form produce solid driving engagement without liability of play or lost motion and to a large extent prevents wear. Locking bolt 24 is in engagement with the upper recess 12 so that the gear 8 is held in driving relation with the pinions 6 and the steering mechanism is fully operative.

By withdrawing the latch 20 and actuating the lock 26 to withdraw the bolt 24 the steering wheel can be tilted about the trunnions 18 as an axis to the position shown in Fig. 4. During this turning movement the cam members 15 ride upon the upper exposed surface 30 of the cap 3 serving with gradually changing fulcrums somewhat after the manner of a lever or toggle member, so that tilting movement of the steering wheel elevates the shaft 11 and moves the gear 8 to the position shown in Fig. 4, in which said gear is uncoupled from driving relation with the pinions 6. In this position of the wheel the lock 26 can be again actuated to engage the bolt 24 with the lower recess 12, thereby locking the steering wheel in its tilted position and in uncoupled relation with the steering mechanism. The wheel can therefore be turned freely about the central axis of the steering shaft but without effect upon said shaft. This arrangement prevents theft or unauthorized use of the vehicle.

The driver of course sits at the left of the wheel as it is illustrated in Fig. 1. Consequently in tilting the wheel in the manner heretofore described the driver's side of the wheel is raised so that there will be no interference with the knees. However, some drivers prefer to tilt the driver's side of the wheel downwardly. This effect can be assured with the present construction. For example, assuming the wheel in the position shown in Fig. 4, it can be rotated freely around the central axis of the steering shaft through 180° and then tilted downwardly into normal position transverse to the shaft. This operation is possible because the side boss or enlargement 31 of the cap 3 which contains the lock 26 is made narrow enough to enter the open end 19 of the recess in the steering wheel hub.

Preferably the key end of the lock 26 and the latch operating button 21 are on opposite sides of the central axis so that the key can be manipulated with one hand and the latch with the other although this is not essential.

What I claim is:

1. Steering mechanism for motor vehicles, comprising a steering shaft, a driving shaft, planetary gearing operatively connecting said shafts, a steering wheel pivoted on a transverse axis, and means whereby tilting movement of said wheel disconnects said planetary gearing.

2. Steering mechanism for motor vehicles, comprising a steering shaft, a driving shaft, gearing connecting said shafts, said driving shaft being movable to couple or uncouple said gearing, and a tilting steering wheel operatively connected to move said driving shaft for coupling or uncoupling said gearing.

3. Steering mechanism for motor vehicles, comprising a steering shaft, a driving shaft, connecting means for said shafts, a tilting steering wheel for operating said driving shaft, and means operated by tilting movement of said wheel for disconnecting said connecting means.

4. Steering mechanism for motor vehicles, comprising a housing, a steering shaft therein, a driving shaft having endwise movement in said housing, gearing connecting said shafts, a steering wheel pivoted to said driving shaft, on a transverse axis, and means actuated by said steering wheel and coöperatively related to said housing and arranged so that tilting movement of said steering wheel produces endwise movement of said driving shaft.

5. Steering mechanism for motor vehicles, comprising a housing, a steering shaft therein, a driving shaft having endwise movement in said housing, gearing connecting said shafts, a steering wheel pivoted to said driving shaft, on a transverse axis, and cam members operated by said steering wheel and engaging the upper portion of the housing for producing endwise movement of said driving shaft when the steering wheel is tilted.

In testimony whereof I affix my signature.

THOMAS D. McMULLEN.